Patented Apr. 27, 1943

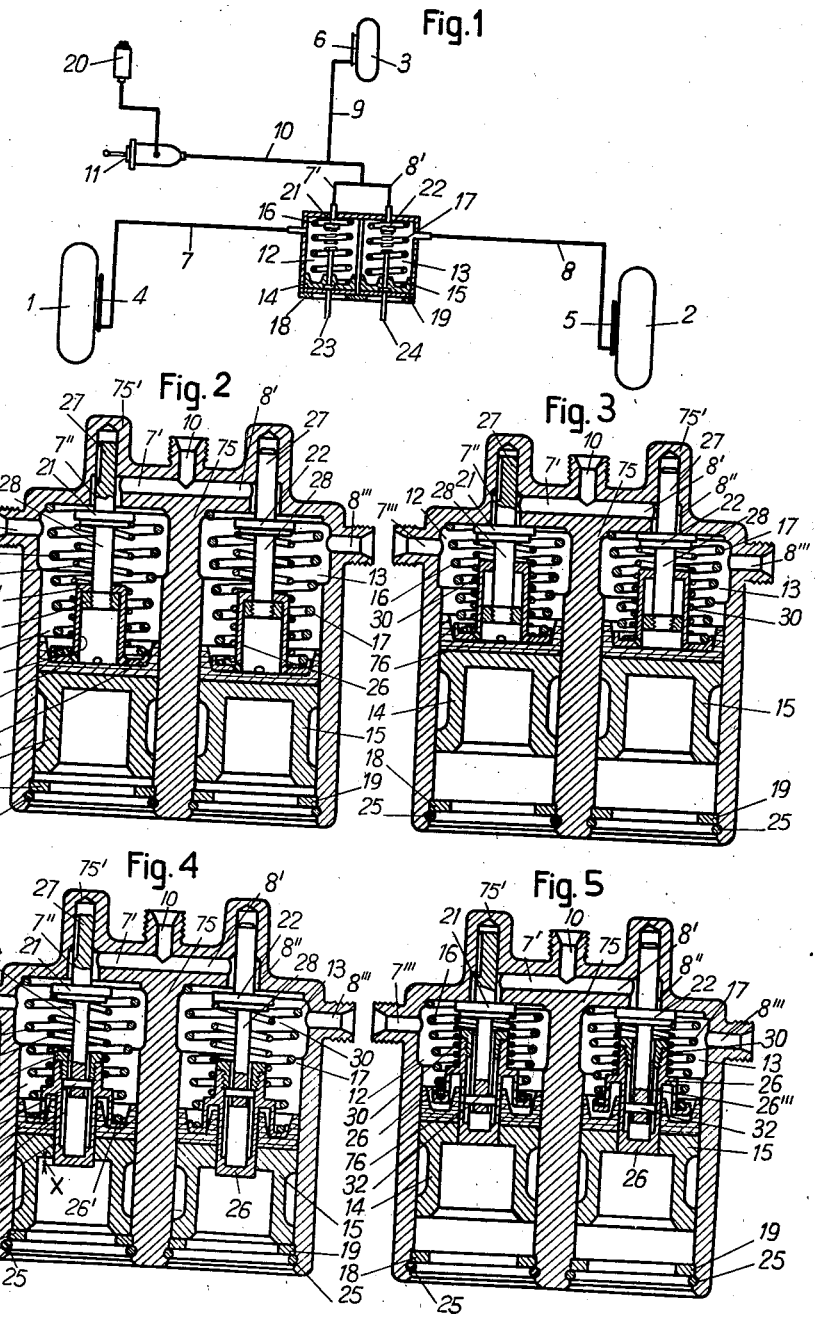

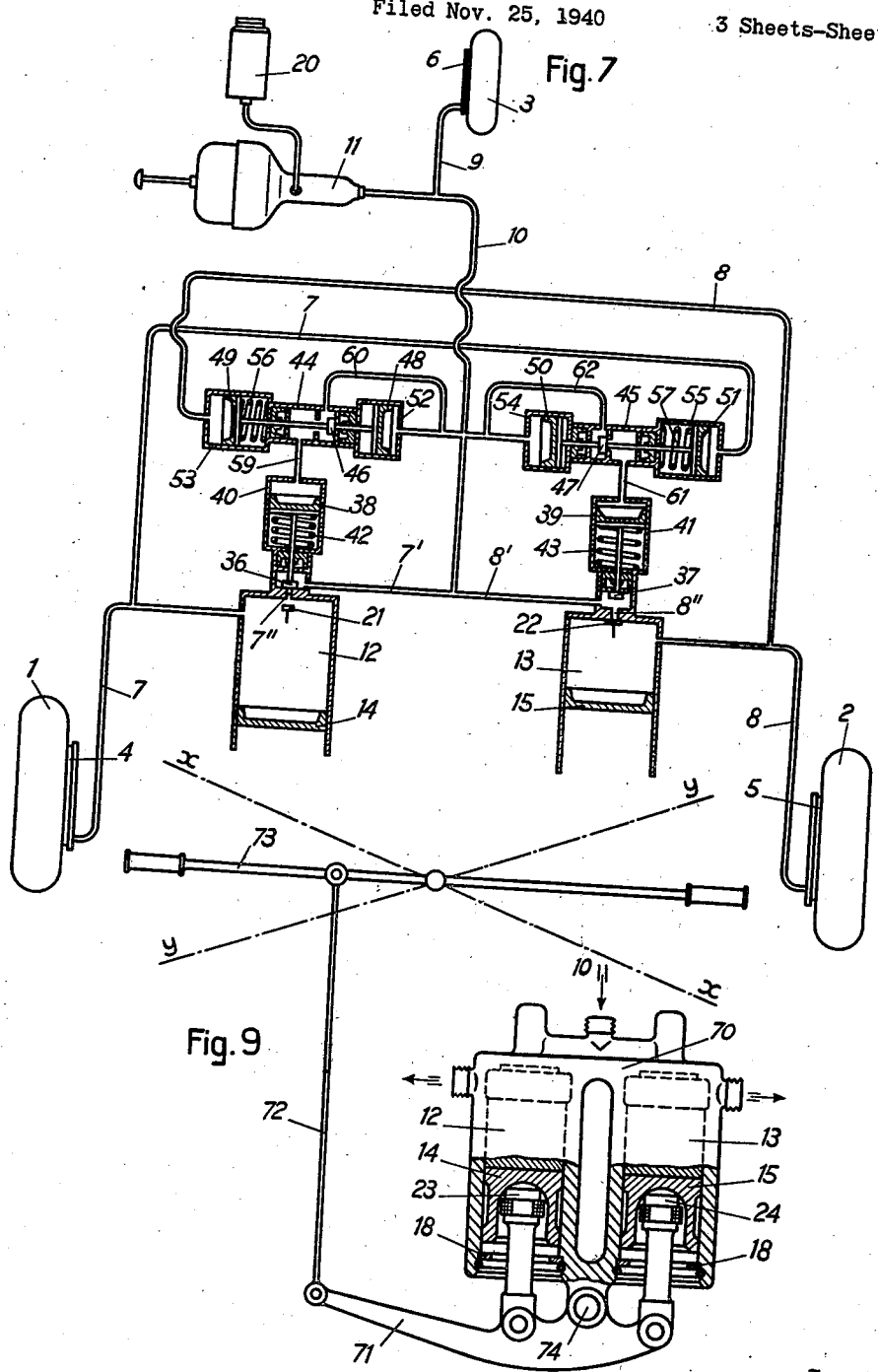

2,317,753

UNITED STATES PATENT OFFICE 2,317,753

BRAKE CONTROL MEANS

Adalberto Garelli, Milan, Italy; vested in the Alien Property Custodian

Application November 25, 1940, Serial No. 367,118
In Italy November 27, 1939

13 Claims. (Cl. 303—6)

This invention relates to fluid pressure control apparatus for brakes of vehicles having wheels arranged at the two sides of the vertical longitudinal middle plane thereof, said control apparatus being operative both for normal brake application that is for an equal brake application on all the vehicle wheels, and for differential brake application that is for the application of brakes at different rates on the vehicle wheels located at the opposite sides with respect to said vertical middle plane of the vehicle.

Control apparatus of the above stated class are extensively used in connection with brake means for the wheels of landing carriage of aircrafts in which the ability of differential brake application on the two side wheels of the landing carriage improves the steer operation at the time of taxying on the landing field and manoeuvering on ground.

On the other hand the control apparatus of the above stated class may be embodied with advantage in brakes of vehicles of different kinds in which wheels located on opposite sides with respect to a vertical longitudinal middle plane of the vehicle are required to be braked through different extents, as it may happen in tanks and caterpillar cars.

In the apparatus of this invention each of the ducts leading to the brake gears of the vehicle wheels in respect of which differential braking is required, includes a variable chamber which normally provides for the flow of pressure liquid to the cooperating brake gear and control means cooperate with said chamber to disconnect it from the supply of pressure liquid and to change its capacity to modify the action of the pressure liquid in the respective brake gear.

The control means may be such as to develop an independent action in the chambers pertaining to brake gears of wheels at the two sides of the vehicle to apply brakes on one side while the prevailing conditions are left unchanged on the other side, or said control means may develop simultaneous and opposite actions in the chambers pertaining to the brake gears of wheels located on opposite sides of the vehicle thus causing a more heavy brake application on the wheels on one of the vehicle sides and a reduced brake application on the wheels on the opposite side.

This invention also includes an embodiment of the above outlined apparatus in which each variable chamber consists of a cylinder having a reciprocable piston therein and is provided with a valve intended to control the communication of said chamber with a pressure liquid supply, said control means causing the valve to close at first and then the piston to move.

This invention comprises further features directed to prevent secondary actions in the particular chamber in which a pressure rise is not produced.

Some embodiments of this invention are illustrated by way of example on the annexed drawings in connection with brake gears for the wheels of a landing carriage of an aircraft, and Fig. 1 is a diagram of the essential parts of the apparatus, Fig. 2 is a section on an enlarged scale of an embodiment of a variable chamber consisting of a cylinder and a piston, Fig. 3 is a section similar to Fig. 2 with the parts in a different position, Fig. 4 is a section of another embodiment of a variable chamber consisting of a cylinder and a piston;

Fig. 5 is a section similar to Fig. 4 with the parts in a different position,

Fig. 7 is a diagram of another embodiment of this invention with a number of parts thereof in section, Fig. 8 is a diagram of the complete brake control apparatus and Fig. 9 shows an embodiment of the control means for differential brake actuation with parts in section.

Figure 8:
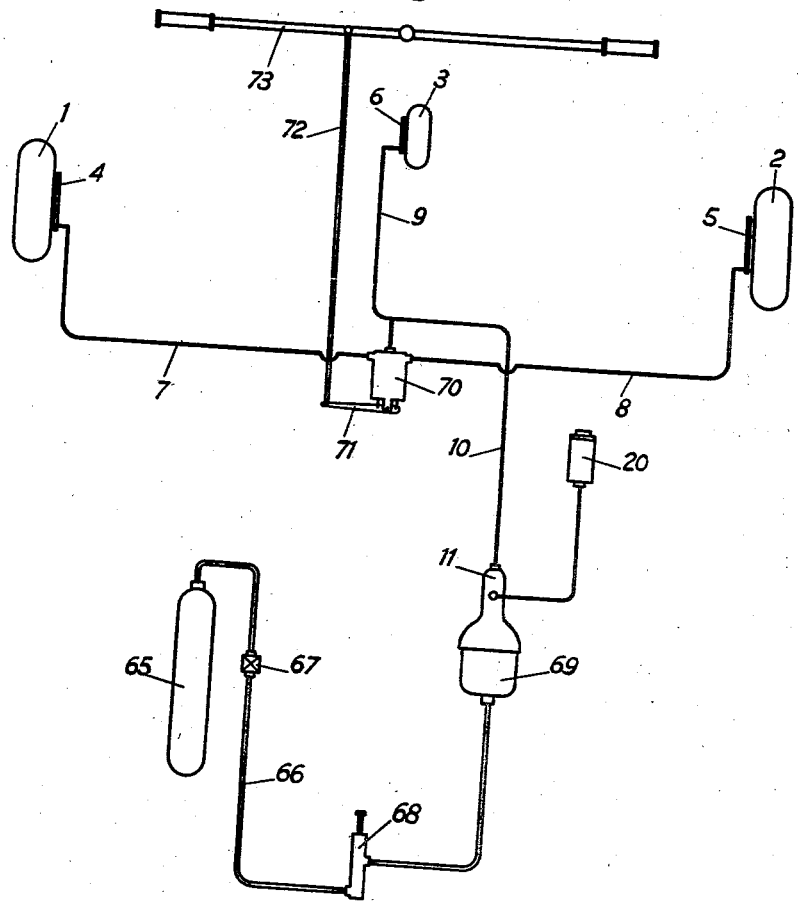

In Fig. 1, I and 2 reference the two side wheels of a landing carriage of an aircraft whose details are not shown and which includes a third intermediate wheel 3.

Each of said wheels 1, 2 and 3 is provided with a brake gear denoted in its whole by the reference 4, 5 and 6 respectively; said brake gears are not illustrated in detail they being of any conventional or approved fluid pressure operated type, including a fluid pressure cylinder and brake shoes actuated by a piston operative in said cylinder against the action of a brake shoe releasing spring. The brake gears 4, 5, 6 are connected with pipes 7—7', 8—8' and 9 connected by a main pipe 10 with a hand operated pump 11 fed by a reservoir 20.

A chamber 12, 13 is inserted in each of the pipes 7, 7' and 8, 8' leading to the brake gears 4 and 5 of the side wheels 1 and 2 of the landing carriage, and each of said chambers 12, 13 includes a movable partition 14, 15 which is held by a respective spring 16, 17 in its stroke end position against stationary or adjustable abutments 18, 19.

The chambers 12, 13 are permanently connected with the pipes 7, 8 leading to brake gears 4, 5 whilst the connections of said chambers 12, 13 with pipes 7', 8' and main pipe 10 leading from the pump 11 are controlled by valves 21, 22. Said valves 21, 22 and the movable partitions 14, 15 are located under the action of operating means illustrated diagrammatically in the form of rods 23, 24.

In the conditions illustrated in Fig. 1, assuming that the system is filled with liquid and the pump 11 is operated by hand to supply liquid from the reservoir 20 under pressure into pipes 10, 9, 7', 8', an uniform pressure prevails in all the pipes 10, 9, 7', 8', 7, 8 and consequently the brake gears 4, 5, 6 of all the wheels 1, 2, 3 are operated to the same extent; a normal brake application is thus obtained.

Should a differential brake application be required, that is should it be required to brake a single one, as 1, of the side wheels, the operator manipulates the control member 23 corresponding with the respective chamber 12 to close the valve 21 at first and consequently to shift the partition 14 connected to member 23 as indicated by reference character 14' to reduce the capacity of the chamber 12.

In the event a normal brake application has been effected before such a differential brake application is required, the liquid in chamber 12, at the time the valve 21 is closed, is at the pressure generated by the pump 11; such pressure being also operative in the chamber 13 of the brake gear 5 of the wheel 2 and in the brake gears 4, 5, 6 of all the wheels 1, 2, 3. However as soon as the valve 21 has been closed, the movement of the partition 14 causes a pressure rise in the chamber 12 and consequently the brake gear 4 of the wheel 1 is energised to a greater degree whilst the brake action in the brake gears 5 and 6 of the wheels 2, 3 is unchanged.

On the contrary should no normal brake action be operative before a differential brake application is produced on a single selected wheel as wheel 1, substantially no pressure exists in the chamber 12 at the time the operator closes the valve 21 and after said valve 21 has been closed and the partition 14 has been moved a pressure is operative only in the chamber 12; consequently the brake action is operative only on the brake gear 4 of the wheel 1 whilst no pressure is operative in the chamber 13 and in the brake gears 5 and 6 and no brake application occurs on the wheels 2 and 3.

On the control actuation being released, the movable partition 14 which has been shifted in the above described operation is restored into its initial position (as shown in Fig. 1) by the respective spring 16 and at the same time the valve 21 is caused to open; the initial connections are thus restored. However if it is desired to apply brakes on the two other wheels 2 and 3 also after the brake has been applied on the wheel 1 only, such brake application may be secured without being necessary to firstly release the differential brake application on the wheel 1 because the pump 11 is free to be operated to increase the pressure operative in the pipes 10, 9, 8; on such an occurrence if the valve 21 is a self-opening one and the pressure supplied by the pump 11 is higher than the pressure generated in the chamber 1 by the actuation of the respective partition 14, an uniform pressure will be caused to operate in the brake gears 4, 5, 6 of all the wheels 1, 2, 3 unless the operator selects to secure a differential brake action by exerting a larger action on the control member 23.

An embodiment of an unit including the chambers 12 and 13 and the parts cooperating with them is shown in Figs. 2 and 3. In said figures, the chambers 12 and 13 are provided cylinders bored in a casting 75 and contain the cooperating pistons 14, 15 each having a seal packing 76, the outward stroke of said pistons being restricted by collars 18, 19 held in position by split rings 25. Each piston 14, 15 extends in a bell shaped sleeve 26 which is forced against the packing 76 by the spring 16 or 17 operative on an outward flange 26' of the sleeve 26 on one side and on opposite end wall of the respective chamber 12, 13 on the other hand.

The valve 21 is guided in an extension 75' of the cylinder head by a stem 27, and it includes an opposite stem 28 adapted to slide in the sleeve 26 and having an end nut 29 which is adapted to engage a top inward flange 26'' of the sleeve 26. A spring 30 located intermediate the valve 21 and the piston 14 holds them at their maximum respective distance as provided by the engagement of the nut 29 against the flange 26''. The arrangement is such as when the piston 14 is in its position shown in Fig. 2, the valve 21 is spaced from the top end wall of the respective chamber 12 and from the orifice 7'' of the duct 7' opening therein and controlled by said valve 21, the pressure liquid being thus free to flow through the chamber 12 to reach the cylinder outlet 7''' and the pipe 7 connecting it with the respective brake gear 4 at the time the normal brake action is operative.

At the time the piston 14 is operated against the return action of the springs 16 and 30, the valve 21 moves with said piston and it closes immediately and to a full extent the orifice 7'' to cut the communication of the inlet duct 7' with outlet 7''' through the chamber 12 and holds said orifice 7'' closed during the subsequent stroke of the piston 14, both springs 16 and 30 being then compressed as shown in Fig. 3. The liquid enclosed in the chamber 12 is thus subject to the control action and it imparts such action to the brake gear 4 of the respective wheel 1 connected with it. At the time the control action on the piston 14 is released, the spring 16 restores the piston 14 in its position shown in Fig. 2.

Shortly before such a position is reached, the flange 26'' of the sleeve 26 engages the nut 29 and removes the valve 21 from the orifice 7'' the communication of the inlet duct 7', 7'' with the outlet 7''' being again opened and the wheel brake gear 4 connected with the outlet 7''' being again subject to the general pressure prevailing in the whole system.

When, as shown in Fig. 1, the abutment 18 engages the piston 14 when it reaches its normal position to prevent any further motion of said piston in the direction of the increase of the capacity of the chamber 12, the piston 14 compresses the liquid in the system also during the first portion of its stroke in which the valve 21 is moved to close the orifice 7''. In this case during the period the overpressure generated by the movement of the piston 14 propagates through ducts 7'', 7', 8', 8'' into the chamber 13 until the valve 21 is closed, and consequently said overpressure may reach the brake gears of all the wheels this occurrence affecting the steering of the aircraft during a differential brake application.

To remove this drawback the reduction of the chamber capacity produced by the piston along the portion of its stroke in which it causes the valve 21 to close may be compensated for, or the valve 21 may be controlled by means actuating it separately from the piston operation.

Figures 2 and 3 illustrate an arrangement of the first of the above outlined classes, in which the abutment 18 is arranged at a suitable distance from the final position of the piston 14 in which it is restored by the springs 16 and 30.

The reduction of the capacity of the chamber 12 as occurs during such portion of the stroke of the piston 14 as necessary to cause the valve 21 to close the cooperating orifice is compensated for in the other chamber 13 of the device by an equivalent increase of volume thereof due to the displacement of the respective piston 15 under the action of the liquid propelled by the piston 14 through conduits 7' and 8'. The liquid pressure in the two conduits 7', 7 and 8', 8 thus remains substantially unchanged along such period of time as required by the valve 21 to close the orifice 7'' and to cut off the intercommunication of the chambers 12 and 13.

Figures 4 and 5 illustrate a construction of the second class in which an operating member acts firstly on the valve 21 and subsequently on the piston 14. For such a purpose the sleeve 26 in which the stem 28 of the valve 21 is mounted to telescope is in turn able to reciprocate in a central opening 31 of the piston 14 and its bottom extends beyond the internal face of the piston (Fig. 4) through an extent X under the action of the spring 16 operative on the stationary flange 26' provided in an intermediate region of the sleeve 26.

A pin 32 extends through the stem 28 of the valve 21 and the ends thereof are guided along internal grooves 26''' of the sleeve 26 the spacing spring 30 holding the pin 32 forced against a collar 33 fast in the top mouth of the sleeve 26. By this arrangement when the parts are in their normal position shown in Fig. 4, the bottom of the sleeve 26 extends from the internal face of the piston 14 through said extent X and the valve 21 is held spaced from the cooperating orifice 7''.

At the beginning of the actuation of the control means for differential brake action, the control means intended to apply a thrust on the bottom face of the piston 14 firstly act on the bottom of the sleeve 26 and thus they cause the valve 21 to close the orifice 7'', the consequent increase of pressure in the system being negligible even in the case where a normal brake application is effected at the same time as a differential brake application. The piston 14 is stationary during the closing stroke of the valve 21 but as soon as this stroke is completed said control means acts on the internal face of the piston 14 and causes the operative stroke of said piston (Fig. 5) along which a pressure is built up in the chamber 12 and duct 7''' and pipe 7 leading to the respective brake gear 4, while no overpressure is generated in other parts of the system the valve 21 being closed.

The control means for the sleeve 26 and piston 14 may comprise a mechanical member operative on said parts in succession or may be a pressure fluid made operative on the end portion of the sleeve 26 and on the face of the piston 14, the above described succession of actuation occurring as an effect of the fact that the sleeve loading spring 30 is weaker than the piston return spring 16.

Figure 6:
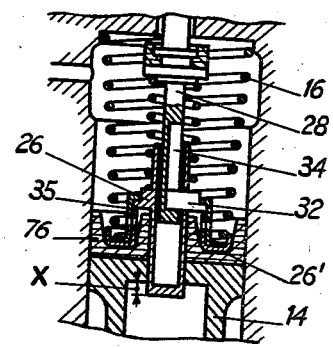
Fig. 6 is a fragmentary section illustrating another embodiment of a cylinder and piston device.

Fig. 6 illustrates a further embodiment of the pressure chamber 12 which differs from that of Figs. 4 and 5 only in respect of the means for engaging the stem 28 with the sleeve 26. To illustrate said engagement the stem 28 and the sleeve 26 are shown in Fig. 6 in section along two planes perpendicular to each other the right hand section being made on the central longitudinal plane of the pin 32 whilst the left hand section is made along a plane perpendicular to the first named one.

As shown in Fig. 6, the pin 32 is fast with the sleeve 26 being engaged with the flange 26' thereof and a superimposed shell 35 both said flange 26' and shell 35 being held forced on the piston 14 and packing 76 thereof by the spring 16; said pin 32 is adapted to slide along a groove 34 of the stem 28. The operation is similar to that described in connection with Figs. 4 and 5 with the added advantage that the diameter of the sleeve 26 may be reduced and the screwthreaded collar 33 may be omitted.

In all the above described embodiments the flow of the pressure liquid through the chamber 12 or 13 is controlled by a valve 21 or 22 which is permanently open at the time the respective piston 14 or 15 does not effect a compression stroke to produce a differential brake application that is when said piston occupies a normal position in which it is held by the spring 16 or beyond such a position in the direction of an increase of capacity of the chamber it moves in.

In these conditions, during a differential brake application the brakes of the two side wheels operate independently that is a variation in capacity of and in pressure within either chamber 12 or 13 has no material action on the conditions operative in the other one.

However it is also possible to obtain that the pressure increases in the brake gear of either of the side wheels and the pressure decreases in the brake gear of the other wheel during a differential brake application. For such a purpose the liquid flow requires to be cut off in both chambers at the beginning of the differential braking action and the reduction of capacity in either chamber as produced by the stroke of the respective piston must be accompanied by a capacity increase in the other chamber produced by a displacement of the respective piston.

In any case the above outlined differential brake operation may occur only when the differential brake application is effected at the same time as a normal brake action. In fact if a differential brake application is only effected, the pressure drop within the particular chamber whose capacity tends to increase, could cause the pressure to become lower than the atmospherical pressure and an air intake into the system could then occur. Consequently the flow of liquid must be cut off in both chambers only when a differential brake application occurs at the same time as a normal brake application; on the contrary when a differential brake application is effected only, the flow of liquid through the chamber whose capacity tends to increase is required to remain free in order to prevent the pressure in the last named chamber from dropping under atmospherical pressure and from increasing beyond a predetermined value during the return stroke of the piston of the concerned chamber to its normal position.

The above defined conditions may be secured by several arrangements. An arrangement proper for the aimed purpose consists in controlling the pressure liquid inlet into the concerned chamber by means of an auxiliary valve this valve cutting the supply of liquid into said chamber under the action of mechanical or electrical or air or liquid pressure means at the time a differential brake application occurs at the same time as a normal brake application whilst said auxiliary valve is left open at the time a normal brake application only or a differential brake application only is operative.

Figure 7 illustrates an apparatus adapted to operate in the above suggested manner; in this figure the side wheels are referenced 1, 2 and the third middle wheel is referenced 3; the pump is denoted by 11, the reservoir by 20 and the chambers intended to supply pressure fluid to the wheel brake gears 4, 5, 6 are referenced 12, 13 these chambers enclosing the pistons 14, 15 reciprocative therein and being able to communicate with the pipe 10 under the control of the respective valves 21, 22; these valves 21, 22 are shown diagrammatically they being supposed to be mounted and actuated by either of arrangements above described with reference to Figs. 2–6 and they are assumed to be in conditions to provide for a differential brake action on the wheel 2 the valve 22 of chamber 13 being closed and the piston 15 of said chamber having been shifted within the chamber 13 towards the orifice of pipe 8 thereinto; on the contrary the valve 21 of chamber 12 is open and the piston 14 is assumed to be beyond its normal position to increase the capacity of the chamber 12.

The chambers 12 and 13 are further provided with auxiliary valves 36, 37 which control the same orifices 7″, 8″ as are controlled by the respective valves 21, 22 and are fast with pistons 38, 39 mounted to move in cylinders 40, 41 against the action of springs 42, 43, the connection of said cylinders 40, 41 with the pressure liquid supply pipe 10 through branches 59, 60 and 61, 62 being controlled by the distributors 44, 45 having valves 46, 47 which control said branches respectively.

Each of valves 46, 47 is fast with a set of two opposed pistons 48, 49 and 50, 51 respectively, arranged to reciprocate in concentric end cylinders 52, 53 and 54, 55 of the distributors 44, 45, the valve 46 being fast with pistons 48, 49 and the valve 47 being fast with pistons 50, 51. The cylinders 52, 54 in which the pistons 48, 50 reciprocate are connected directly with the pipe 10 leading from the pump 11 while the cylinders 53, 55 in which the pistons 49, 51 move are connected with the pipes 8 and 7; the springs 56, 57 actuate the respective sets 46, 48, 49 and 47, 50, 51 to hold the valves 46, 47 in position to cut the branches 59, 60 and 61, 62 respectively. As an effect of the described arrangement and connections the valve 46 is opened by the actuation of the piston 49 when pressure for differential brake action is operative in the chamber 13 and the valve 47 is opened by the actuation of the piston 51 when the differential brake application pressure is made operative in the chamber 12. In the conditions illustrated in Fig. 7 where the pressure for differential brake application is operative in the chamber 13, the piston 49 is shifted and it holds the valve 46 open.

When, as assumed, the normal brake application is operative at the same time as a differential brake application, the pressure liquid supplied by the pump 11 on flowing through pipes 10, 60, valve 46 which is open as above described, and pipe 59 actuates the piston 38 and it causes the valve 36 to close; any further supply of pressure fluid by the pump 11 into the chamber 12 is thus prevented and an increase of the capacity of the chamber 12 by an outward displacement of the piston 14 beyond its normal position causes the pressure operative in the brake gear 4 of the wheel 1 to decrease.

If a normal brake application is not operative at the same time as a differential brake application, the valve 46 is also opened by the actuation of piston 49 under the action of the pressure supplied from the chamber 13 but the liquid in the pipe 10 is not under pressure and consequently it does not actuate the piston 38 the valve 36 being left open.

In this case a liquid inflow into the chamber 12 may occur through pipes 10 and 7′ on the capacity of said chamber 12 still tending to increase; accordingly the liquid pressure in the chamber 12 cannot drop under the atmospherical pressure and an over-pressure beyond a predetermined value cannot prevail during the return stroke of the piston 14 into its normal position.

Fig. 7 shows an example of a control device for auxiliary valves 36, 37 intended to close the inflow of liquid into the chambers 12 and 13 respectively when a differential brake application occurs at the same time as a normal brake application, said valves being left open at the time either a normal or a differential brake application occurs alone.

Figure 8 shows diagrammatically a plant including a source of compressed air or other compressed fluid for actuating the pump 11 which is intended to inject oil or another liquid in the pipe system leading to brake gears of the wheels. In Fig. 8, 65 denotes a reservoir containing pressure fluid which is supplied through the pipe 66 and through a pressure governor 67 to a control device 68 for supply of operative fluid in a motor 69 which actuates the oil pump 11 supplied by a reservoir 20. Said pump 11 feeds pressure oil into an unit 70 through the pipe 10, said unit 70 including two cylinders equivalent to the chambers 12, 13 shown in detail in Fig. 1 and equipped as shown in Figs. 2, 4 or 6.

The actuation of the pistons as 14 and 15 operative in said unit chambers is effected by means of a lever 71 which is connected by means of a stem 72 to a rudder bar 73 intended to control the steering rudder of the aircraft or an equivalent member.

The pipes 7 and 8 leading to the side wheel brake gears 4 and 5 branch from the unit 70 while the duct 9 leading to the brake gear 6 of the third wheel 3 is branched in advance to the unit 70.

Fig. 9 illustrates by way of example a control device of the above class adapted for differential braking action. Said device includes two rods 23 and 24 abutting on the pistons 14 and 15 which are urged by springs, not shown, and equivalent to springs 30 as above described. The rods 23, 24 are pivotally connected with a lever 71 fulcrumed in the unit 30 at a point 74 intermediate the pivotal connections of said two rods 23, 24, the end of the lever 71 being connected by a rod 72 with the rudder bar 73 actuating the aircraft rudder or another equivalent device.

At the time the rudder bar 73 is in its position shown in full lines, the pistons 14, 15 of the apparatus are in their normal position; on the contrary when the rudder bar 73 takes its inclined position in the direction of the axis —x—x— under the operator action, the rod 23 applies a thrust on the piston 14 and this piston begins to move in the chamber 12 to effect its compression stroke for a differential brake action. On the contrary the rod 24 permits the piston 15 to move beyond its normal position under the action of its return spring (not shown) until it engages the abutment 18 the rod 24 thereafter being able to become spaced from the piston 15.

When the rudder bar 73 is carried in its position defined by the axis —y—y— a differential brake action occurs in the chamber 13.

What I claim as my invention and desire to secure by United States Letters Patent is:

1. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective one of said conduits for controlling the communication of each of said chambers with said respective conduit, auxiliary means for controlling the communication of each of said chambers with said respective conduit, means for varying the capacity of each of said chambers to cause the fluid therein to operate in the respective brake gear, means for actuating said controlling means to cut said communication for each of said chambers when the respective capacity varying means are operated, means for actuating said auxiliary controlling means to cut said communication for said chambers, the last named actuating means being operative under the joint action of said generator pressure fluid and of the fluid discharged from any of said chambers whose capacity varying means are operated, and means urging said auxiliary controlling means in a position to restore said communication.

2. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective one of said conduits for controlling the communication of each of said chambers with said respective conduit, auxiliary means for controlling the communication of each of said chambers with said respective conduit, means for varying the capacity of each of said chambers to cause the fluid therein to operate in the respective brake gear, means for actuating said controlling means to cut said communication for each of said chambers when the respective capacity varying means are operated, fluid pressure energized means for actuating said auxiliary controlling means to cut said communication for said chambers, the last named actuating means being operative under the joint action of said generator pressure fluid and of the fluid discharged from any of said chambers whose capacity varying means are operated, and means urging said auxiliary controlling means in a position to restore said communication.

3. A fluid pressure system for general and differential actuation of brake gears in vehicles, comprising a pressure fluid operated brake gear for each vehicle wheel to be braked, a generator of pressure fluid, conduits leading from said pressure fluid generator to each of said brake gears said conduits being interconnected to form a single circuit, a chamber inserted in each of said conduits leading to ones of said brake gears to be operated differentially, means for operating said generator, means ahead of each of said chambers in the respective one of said conduits for controlling the communication of each of said chambers with said respective conduit, auxiliary means for controlling the communication of each of said chambers with said respective conduit, means for varying the capacity of each of said chambers to cause the fluid therein to operate in the respective brake gear, means for actuating said controlling means to cut said communication for each of said chambers when the respective capacity varying means are operated, actuating means energized by fluid pressure supplied by said generator for said auxiliary controlling means of each chamber to cut said communication, a valve restricting the supply of said generator fluid pressure to said auxiliary controlling means actuating means of each of said chambers and means for opening said valves the last named means being actuated by the operation of said capacity varying means of any of said chambers.

4. A fluid pressure system for general and differential actuation of brake gears in vehicles, comprising a pressure fluid operated brake gear for each vehicle wheel to be braked, a generator of pressure fluid, conduits leading from said pressure fluid generator to each of said brake gears and conduits being interconnected to form a single circuit, a chamber inserted in each of said conduits leading to ones of said brake gears to be operated differentially, means for operating said generator, means ahead of each of said chambers in the respective one of said conduits for controlling the communication of each of said chambers with said respective conduit, auxiliary means for controlling the communication of each of said chambers with said respective conduit, means for varying the capacity of each of said chambers to cause the fluid therein to operate in the respective brake gear, means for actuating said controlling means to cut said communication for each of said chambers when the respective capacity varying means are operated, pistons energized by fluid pressure supplied by said generator and each actuating said auxiliary controlling means of one of said chambers to cut said communication thereof, valves each controlling the supply of energising fluid pressure to one of said pistons and means operating said valve and energized by said generator fluid pressure to close said valve and by fluid pressure supplied from any of said chambers when said capacity varying means are operative, to open said valve.

5. A fluid pressure system for general and differential actuation of brake gears in vehicles, comprising a pressure fluid operated brake gear for each vehicle wheel to be braked, a generator of pressure fluid, means for operating said generator, a cylinder for each of said brake gears to be operated differentially the chamber of said cylinder having a connection with said pressure fluid generator and a connection with said respective brake gear said connections forming a single circuit, a piston arranged to reciprocate in said cylinder, means for operating each of said pistons to cause the fluid in the respective cylinder to operate in said brake gear connected therewith, return means for said piston, a valve mounted to reciprocate in said piston and cooperating with said pressure fluid generator connection of said cylinder to close it on said piston being operated to discharge fluid from said respective cylinder, means defining the range of reciprocation of said valve with respect to said piston and means urging said valve towards the end of its reciprocation near to said connection cooperating therewith.

6. A fluid pressure system for general and differential actuation of brake gears in vehicles, comprising a pressure fluid operated brake gear for each vehicle wheel to be braked, a generator of pressure fluid, means for operating said generator, a cylinder for each of said brake gears to be operated differentially the chamber of said cylinder having a connection with said pressure fluid generator and a connection with said respective brake gear said connections forming a single circuit, a piston arranged to reciprocate in said cylinder, means for operating each of said pistons to cause the fluid in the respective cylinder to operate in said brake gear connected therewith, means acting to restore said piston in an inoperative position in said cylinder said piston being free to take a final position beyond said inoperative position in the direction of increase of the capacity of said cylinder chamber to compensate for a temporary increase of pressure therein, means stopping said piston in said final position, and a valve on said piston cooperating with said pressure fluid generator connection of said cylinder to close it on said piston being operated to discharge fluid from said respective cylinder.

7. A fluid pressure system for general and differential actuation of brake gears in vehicles, comprising a pressure fluid operated brake gear for each vehicle wheel to be braked, a generator of pressure fluid, means for operating said generator, a cylinder for each of said brake gears to be operated differentially the chamber of said cylinder having a connection with said pressure fluid generator and a connection with said respective brake gear said connections forming a single circuit, a piston arranged to reciprocate in said cylinder, a valve mounted to reciprocate through said piston and to cooperate with said pressure fluid generator connection of said cylinder to close it on said piston being operated to discharge fluid from said respective cylinder, means defining the range of reciprocation of said valve with respect to said piston, means urging said valve towards the end of its reciprocation near to said connection cooperating therewith, means for actuating in succession said valve to cause it to close said connection cooperating therewith and subsequently said piston to cause the fluid in said respective cylinder to operate in said brake gear connected therewith, and return means for said piston.

8. A fluid pressure system for general and differential actuation of brake gears in vehicles, comprising a pressure fluid operated brake gear for each vehicle to be braked, a generator of pressure fluid, means for operating said generator, a cylinder for each of said brake gears to be operated differentially the chamber of said cylinder having a connection with said pressure fluid generator and a connection with said respective brake gear said connections forming a single circuit, a piston arranged to reciprocate in said cylinder, a sleeve on said piston, a valve mounted to reciprocate through said sleeve and piston and to cooperate with said pressure fluid generator connection of said cylinder to close it on said piston being operated to discharge fluid from said respective cylinder, a cooperating pin and slot lost motion connection between said sleeve and valve, a spring operative on said sleeve and valve to urge said valve towards the end of its reciprocation near to said connection cooperating therewith, means for actuating in succession said valve to cause it to close said connection cooperating therewith and subsequently said piston to cause the fluid in said respective cylinder to operate in said brake gear connected therewith, and return means for said piston.

9. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective conduits to control the communication of said chambers with said pressure fluid generator, means for varying the capacity of each of said chambers to cause the fluid therein to operate in the respective brake gear, and a single actuating member for each of said chambers said actuating member being operative firstly on said control means of the respective chamber to cut the communication thereof with said pressure fluid generator and then on said capacity varying means of the same chamber to reduce the capacity thereof.

10. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective conduits to control the communication of said chambers with said pressure fluid generator, means for varying the capacity of each of said chambers to cause the fluid therein to operate in the respective brake gear, means for lost motion connecting said communication controlling means with said capacity varying means and a single actuating member for each of said chambers said actuating member being operative on said capacity varying means firstly to bring said control means in closed position and then to reduce the capacity of said chamber.

11. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective conduits to control the communication of said chambers with said pressure fluid generator, means for varying the capacity of each of said chambers to cause the fluid therein to operate in the respective brake gear, means elastically connecting said communication controlling means with said capacity controlling means, and a single actuating member for each of said chambers said actuating member being operative on said control means of the respective chamber firstly to cut the communication thereof with said pressure fluid generator and then on said capacity varying means of the same chamber to reduce the capacity thereof.

12. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective conduits to control the communication of said chambers with said pressure fluid generator, means for varying the capacity of each of said chambers to cause the fluid therein to operate in the respective brake gear, means elastically connecting said communication controlling means with said capacity controlling means, a single actuating member for each of said chambers said actuating member being operative on said control means of the respective chamber firstly to cut the communication thereof with said pressure fluid generator and then on said capacity varying means of the same chamber to reduce the capacity thereof and operating means acting on said actuating members to cause a reverse operation of said actuating members which cooperate with said chambers connected with brake gears pertaining to wheels located on opposite sides of the vehicle.

13. A fluid pressure system for general and differential actuation of brake gears in vehicles, comprising a pressure fluid operated brake gear for each vehicle wheel to be braked, a generator of pressure fluid, means for operating said generator, conduits leading from said pressure fluid generator to each of said brake gears said conduits being interconnected to form a single circuit, a chamber inserted in each of said conduits leading to one of said brake gears to be operated differentially, means ahead of each of said chambers in the respective conduits to control the communication of said chambers with said pressure fluid generator, means for varying the capacity of each of said chambers to cause the fluid therein to operate in the respective brake gear, a single actuating member for each of said chambers said actuating member being operative firstly on said control means of the respective chamber to cut the communication thereof with said pressure fluid generator and then on said capacity varying means of the same chamber to reduce the capacity thereof, and operating means acting on said actuating members to cause a reverse operation of said actuating members which cooperate with said chambers connected with brake gears pertaining to wheels located on opposite sides of the vehicle.

ADALBERTO GARELLI.